July 7, 1959  P. FERRIER  2,893,524
CLUTCHES
Filed Nov. 18, 1958  2 Sheets-Sheet 1
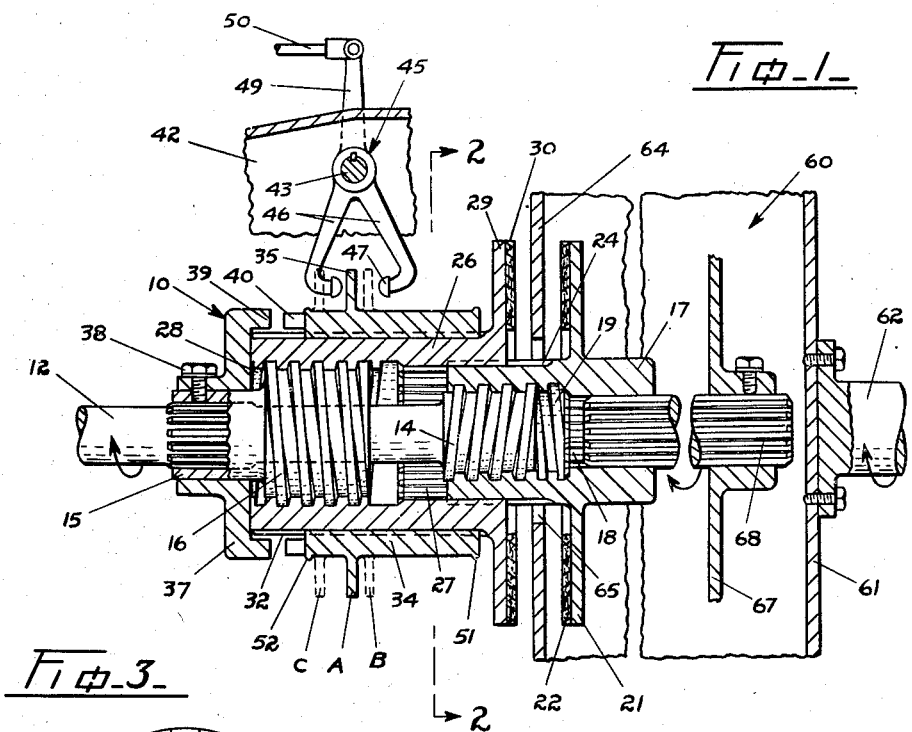
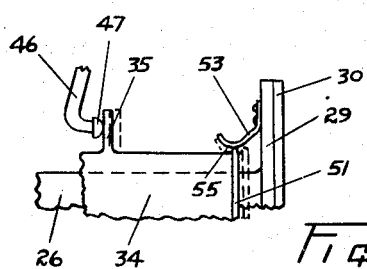
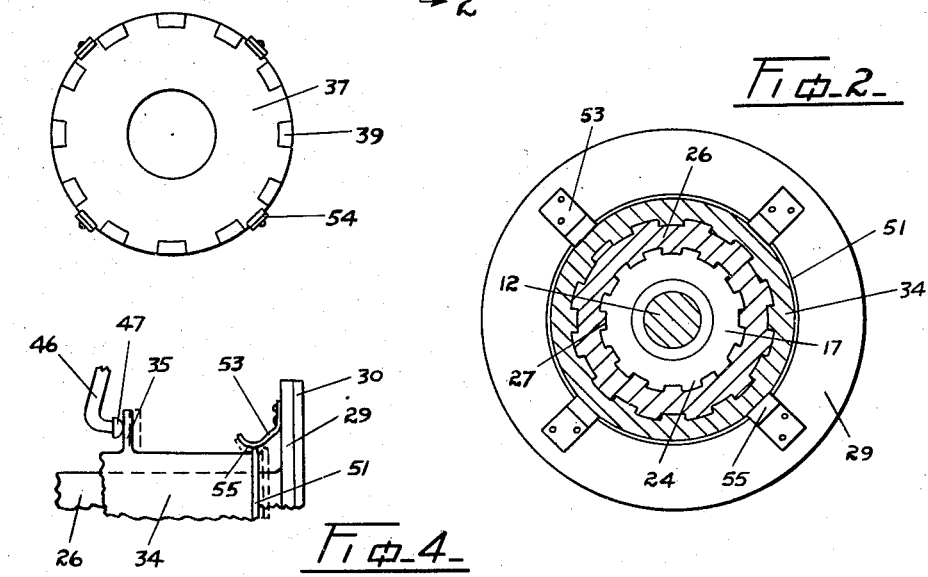
INVENTOR
PETER FERRIER
Ernest E Carver
ATTORNEY July 7, 1959  P. FERRIER  2,893,524
CLUTCHES
Filed Nov. 18, 1958  2 Sheets-Sheet 2
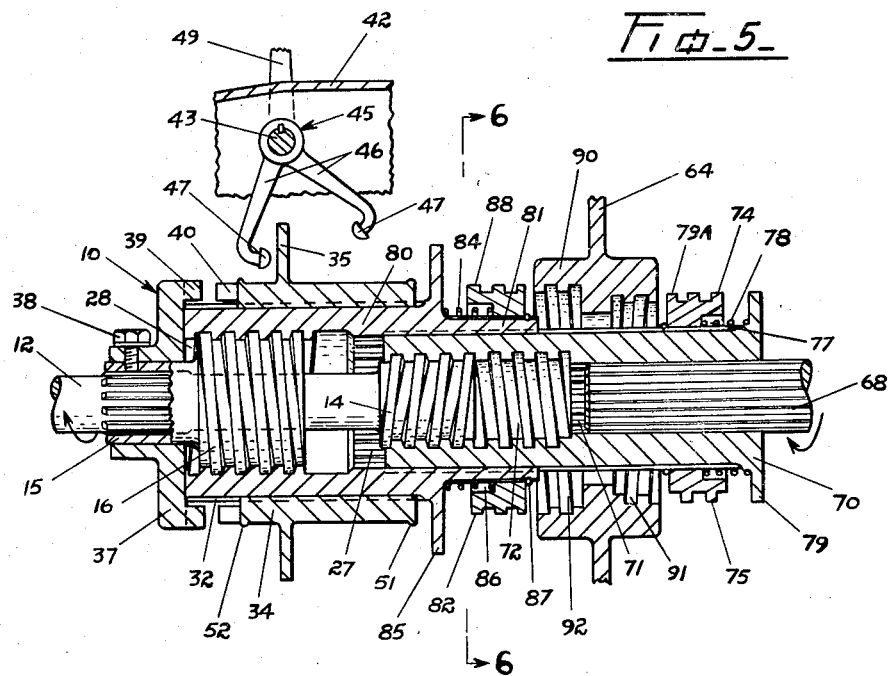
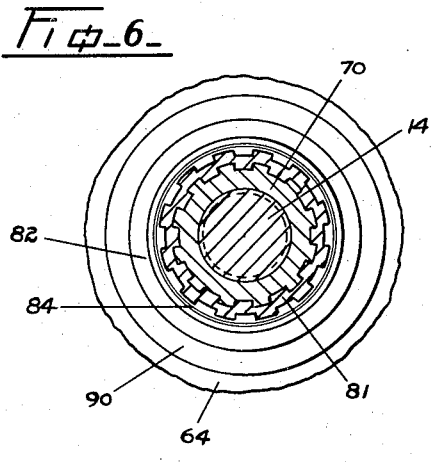
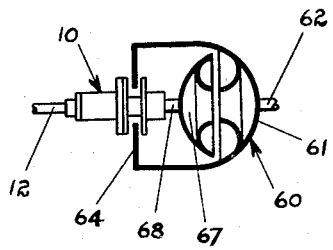
INVENTOR
PETER FERRIER
Ernest E Carver
ATTORNEY

United States Patent Office 2,893,524
Patented July 7, 1959

2,893,524
CLUTCHES

Peter Ferrier, Vancouver, British Columbia, Canada

Application November 18, 1958, Serial No. 774,765

6 Claims. (Cl. 192—3.2)

This invention relates to a device which is particularly adapted for use as an auxiliary clutch on a motor vehicle having a fluid drive or a transmission of the hydraulic torque converter type.

One of the disadvantages of conventional fluid drives and the like is that the engine cannot effectively be used to brake the car, particularly at low speeds, so that the whole retarding strain must be carried entirely by the car's normal braking system. Another objection to this type of drive is that when an attempt is made to start the motor by pushing the car a considerable speed must be attained before the motor will turn over fast enough to start.

The objects of the present invention are to overcome the above-mentioned difficulties by providing a clutch which will automatically connect the engine crankshaft to the transmission output shaft whenever the speed of said output shaft exceeds that of the crankshaft and to provide simple and effective means which will permit the driver to lock the several clutch parts in disengaged position if desired.

Referring to the accompanying drawings:

Figure 1 is a longitudinal section of the invention.

Figure 2 is a transverse section taken on the line 2—2 of Figure 1.

Figure 3 is an elevation of the front face of the stop collar.

Figure 4 is a detail view showing the action of the spring retaining clips for the locking slide.

Figure 5 is a longitudinal section of a modification of the invention.

Figure 6 is a transverse section taken on the line 6—6 of Figure 5.

Figure 7 is a diagrammatic view showing the preferred connection of the auxiliary clutch to a fluid drive or coupling.

In the drawings like characters of reference indicate corresponding parts in each figure.

The numeral 10 indicates generally a clutch having an output shaft 12, which shaft is provided at one end with a thread 14. Spaced from the thread 14 and nonrotatably mounted upon the shaft 12 is a short sleeve 15 having a thread 16 which thread is here shown as having a larger outside diameter than the thread 14. Both the threads 14 and 16 are preferably multi-start square threads and are of the same pitch but of opposite hand. In other words, the thread 14 is left hand and the thread 16 is right hand as shown in Figure 1 of the drawing.

Fitted to the shaft 12 is an inner clutch sleeve 17 having on its inner periphery a spline 18 and a thread 19, which thread engages the thread 14 on said shaft. Intermediate the length of the inner clutch sleeve 17 is an integral flange or clutch plate 21 which is faced on one side with an annular band 22 of a suitable clutch material. The outer periphery of the sleeve 17 is splined as at 24 and the splined portion of said sleeve projects into an outer clutch sleeve 26 having mating internal splines 27. An internal thread 28 is provided in the outer sleeve 26 to engage the right hand thread 16 on the sleeve 15 and one end of said outer sleeve has a clutch plate 29 fitted with a band 30 of clutch material. The sleeve 26 is provided on its outer periphery with splines 32 which are engaged by an internally splined tubular locking slide 34 having a shift flange 35 intermediate its length.

The outer sleeve 26 is limited with regards to its endwise movement in one direction by means of a stop collar 37 provided on the shaft 12 to the rear of the thread 16. A locking bolt 38 extends through the stop collar 37 and the sleeve 15 and serves to hold these two parts against endwise movement upon the output shaft 12. The stop collar 37 is provided with a row of forwardly projecting dog teeth 39, see Figures 1 and 3, which are adapted to engage similarly spaced dog teeth 40 formed on the rear edge of the locking slide 34.

The clutch 10 would preferably be enclosed within a stationary housing 42 and journalled in said housing is a transverse shaft 43. Secured to the shaft 43 within the housing 42 and in the vertical plane of the output shaft 12 is a shifter fork 45 having downwardly diverging arms 46. The lower ends of the arms 46 are fitted with knobs 47 which are spaced on either side of the shift flange 35 on the locking slide 34. A lever 49 is fitted to the shaft 43 externally of the housing 42 and pivotally connected to said lever is a push-pull rod 50 which is adapted to be actuated by the driver of the vehicle to rock said shaft and the fork 45.

The locking slide 34 is provided with a bead 51 at one end and with a similar bead 52 at its opposite end. On the rear face of the clutch plate 29 a plurality of spring retaining clips 53 are secured, see Figures 2 and 4, and on the periphery of the stop collar 37 are similar spring clips 54, see Figure 3 only. The clips 53 and 54 are all outwardly bent at their ends as at 55 so as to slide over their respective beads 51 and 52 and impose a resilient restraint upon the movement of the locking slide 34.

During the normal automatic operation of the clutch 10 the shifter fork 45 is positioned as shown in Figure 1 and the slide 34 is free to reciprocate between the solid line position A and the dotted line position B. The shifter fork 45 is adapted to move the locking slide 34 from position A to position C and return. In both position A and position C the slide 34 is lightly held by the spring clips 53 and 54 as previously stated. As shown in Figure 4 the spring clips are first raised when contacted by the adjoining bead on the slide 34 and on returning to their original position impart a slight additional endwise movement to said slide. This final slide movement disposes the flange 35 clear of the knob 47 by which it was last engaged so that the slide 34 is free to rotate out of contact with a stationary clutch part.

The above described clutch 10 is particularly intended for use in a car's transmission and preferably would be located adjacent to the fluid drive 60, see particularly Figures 1 and 7. Such a fluid drive coupling includes an impeller casing 61 which is secured to the rear end of the crankshaft 62. The casing 61 is suitably provided with a vertical wall 64 which serves as a driven clutch plate and which is disposed between the clutch plates 21 and 29 and has a central opening 65 through which the inner clutch sleeve 17 extends. The casing 61 drives a turbine 67 which is secured to a splined shaft 68 and said shaft is slidably received in the splines 18 of the inner sleeve 17. The output shaft 12 is connected through the conventional clutch and gear train to the propeller shaft or in other words is coupled to the rear wheels of the car.

In the modification of Figures 5 and 6 the clutch 10 has an elongated inner sleeve 70 and said sleeve has a splined bore 71 and a threaded counterbore 72 in which the turbine shaft 68 and the thread 14 respectively are received. Slidably and non-rotatably mounted on the sleeve 70 is a clutch ring 74 having on its outer periphery a right hand multi-start square thread 75. A recess 77 is formed in the ring 74 and provides a seat for a helical spring 78 which encircles the inner sleeve 70 and bears against a flange 79 thereon. The spring 78 normally holds the clutch ring against a circular stop ring 79A fitted to the sleeve 70.

The outer sleeve 80 of the modification has an extension 81 at its forward end and slidably and nonrotatably mounted on said extension is a second clutch ring 82. The ring 82 is also provided with a spring 84 interposed between a flange 85 and the base of a recess 86 which is formed in said second clutch ring. The spring 84 holds the ring 82 in contact with a circular stop ring 87 on the extension 81. The thread 88 on the clutch ring 82 is a multi-start left hand square thread of the same pitch as the thread 75. For the modified clutch the wall 64 of the impeller casing 61 is provided with a tubular hub 90 through which the inner sleeve 70 extends. The hub 90 has female threads 91 and 92 which are adapted to receive the threaded clutch rings 74 and 82 respectively.

As the car equipped with the device is driven in a forward direction by its motor the crankshaft 62 rotates in a clockwise direction as viewed from the right of Figure 1. The turbine 67 is rotated in the same direction and the drive is then from the shaft 68 to the inner and outer clutch sleeves 17 and 26. Since the sleeve 26 is bearing against the stop collar 37 the two clutch sleeves cannot move further apart and the drive is transmitted directly to the output shaft 12 and thence to the rear wheels of the car. If the driver removes his foot from the accelerator to slow down the motor the car's forward momentum rotates the rear wheels faster than the crankshaft or in other words causes the shaft 12 to overrun the shaft 68. During this overrunning, the shafts 12 and 68 obviously continue to rotate in the same clockwise direction, but the relative rotation therebetween causes the threads 14 and 16 to turn within the sleeves 17 and 26 so that said sleeves are moved towards one another. The clutch plates 21 and 29 on the inner and outer sleeves engage and grip the wall 64 of the impeller casing 60 and the output shaft 12 is then locked to the crankshaft 62 and the motor will serve as a brake to slow down the car. As the gas pedal is again depressed to accelerate the car the speed of the shaft 68 momentarily exceeds that of the shaft 12, the two clutch sleeves 17 and 26 are turned upon the opposed threads on said shaft 12 and are moved apart so that the clutch plates 21 and 29 release their grip upon the wall 64 of the impeller casing. The drive is then directly through the clutch from the turbine shaft 68 to the output shaft 12.

If the driver of the car does not want the auxiliary clutch 10 to function automatically as described, he rocks the shifter fork 45 through the medium of the push-pull rod 50 to slide the locking slide 34 along the sleeve 26 from position A to position B. The dog teeth 40 on the slide 34 are then in engagement with the dog teeth 39 on the stop collar 37 and since said slide is also splined to the sleeve 26 no relative rotation can take place between the shaft 12 and the other clutch parts. Thus the clutch 10 is locked in inoperative position and turns as a unit with the flange 35 held in position C and the fluid drive will operate in the conventional manner until the locking sleeve is again moved from position C to position A of Figure 1.

The operation of the modified form of the clutch 10 is as follows. When the shaft 12 overruns the shaft 68 the sleeves 70 and 80 are caused to move towards each other in the previously described manner. At this time the entire clutch is rotating in the same clockwise direction but at a greater speed than the impeller wall 64. The inner and outer sleeves move longitudinally and at the same time rotate their clutch rings 74 and 82 relative to the impeller wall 64. This results in the rings 74 and 82 being advanced into the hub 90 and when the limit of the ring travel is reached the output shaft 12 is directly coupled to the impeller casing which in turn is secured to the engine crank case. It will be noted that the springs 78 and 84 take up the initial shock incidental to the clutch rings 74 and 82 being thrust into contact with the hub 90. Such a clutch provides a positive lock between the several clutch parts and the impeller casing and no slippage can possibly take place.

What I claim as my invention is:

1. The combination of a fluid drive coupling having a drive member and a driven member, a clutch comprising an output shaft having opposed threads, an inner clutch sleeve engaging one of the opposed threads and being operatively connected to the driven member, an outer clutch sleeve slidably and non-rotatively mounted on the inner clutch sleeve, said outer clutch sleeve engaging the second of the opposed threads, a clutch element secured to the drive member, said outer and inner clutch sleeves each having a clutch member, said clutch members being normally spaced on either side of the clutch element of the drive member, said clutch members being moved into driving engagement with the clutch element in response to rotation of the output shaft within the inner and outer sleeves.

2. The combination as claimed in claim 1 and means for limiting movement of the inner and outer sleeves away from the clutch element.

3. The combination of a fluid drive coupling having a drive member and a driven member, a clutch comprising an output shaft having opposed threads, an inner clutch sleeve engaging one of the opposed threads and being operatively connected to the driven member, an outer clutch sleeve slidably and non-rotatively mounted on the inner clutch sleeve, said outer clutch sleeve engaging the second of the opposed threads, an annular clutch element secured to the drive member, said outer and inner clutch sleeves each having a clutch member, said clutch members being normally spaced on either side of the clutch element of the drive member, said clutch members being moved into driving engagement with the clutch element in response to rotation of the output shaft within the inner and outer sleeves, a locking slide non-rotatably mounted upon the outer sleeve, a stop collar secured to the output shaft, said locking slide and stop collar having complementary dog teeth, and manually operable means for moving the locking slide along the outer sleeve into non-rotative engagement with the stop collar.

4. The combination as claimed in claim 3, wherein the locking slide has a bead at each end and the stop collar and outer clutch sleeve are provided with spring means which engage an adjacent bead and resiliently retain the locking slide against endwise movement.

5. In a clutch and a fluid drive coupling combination, said coupling having a drive member and a driven member, said drive member having a clutch element provided with a hub, said hub having a pair of internal threads, said clutch comprising an output shaft having opposed threads, an inner clutch sleeve extending through the hub and being operatively connected to the driven member, said inner clutch sleeve engaging one of the opposed threads, a first threaded clutch ring non-rotatably supported on the inner clutch sleeve, an outer clutch sleeve slidably and non-rotatably mounted on the inner clutch sleeve, said outer clutch sleeve engaging the second of the opposed threads, a second threaded clutch ring non-rotatably mounted on the outer clutch sleeve, said first and second clutch rings being spaced on either side of the clutch element and being advanced into engagement with one each of the internal threads of the hub in response to rotation of the output shaft within the inner and outer sleeves.

6. In a clutch and fluid drive coupling combination as claimed in claim 5, wherein the first and second threaded clutch rings have limited sliding movement on their respective sleeves and spring means are provided to resist the sliding movement of each of the clutch rings.

References Cited in the file of this patent

UNITED STATES PATENTS 2,073,357    Wemp _____ Mar. 9, 1937
2,245,017    Sinclair _____ June 10, 1941